United States Patent Office 2,984,047
Patented May 16, 1961

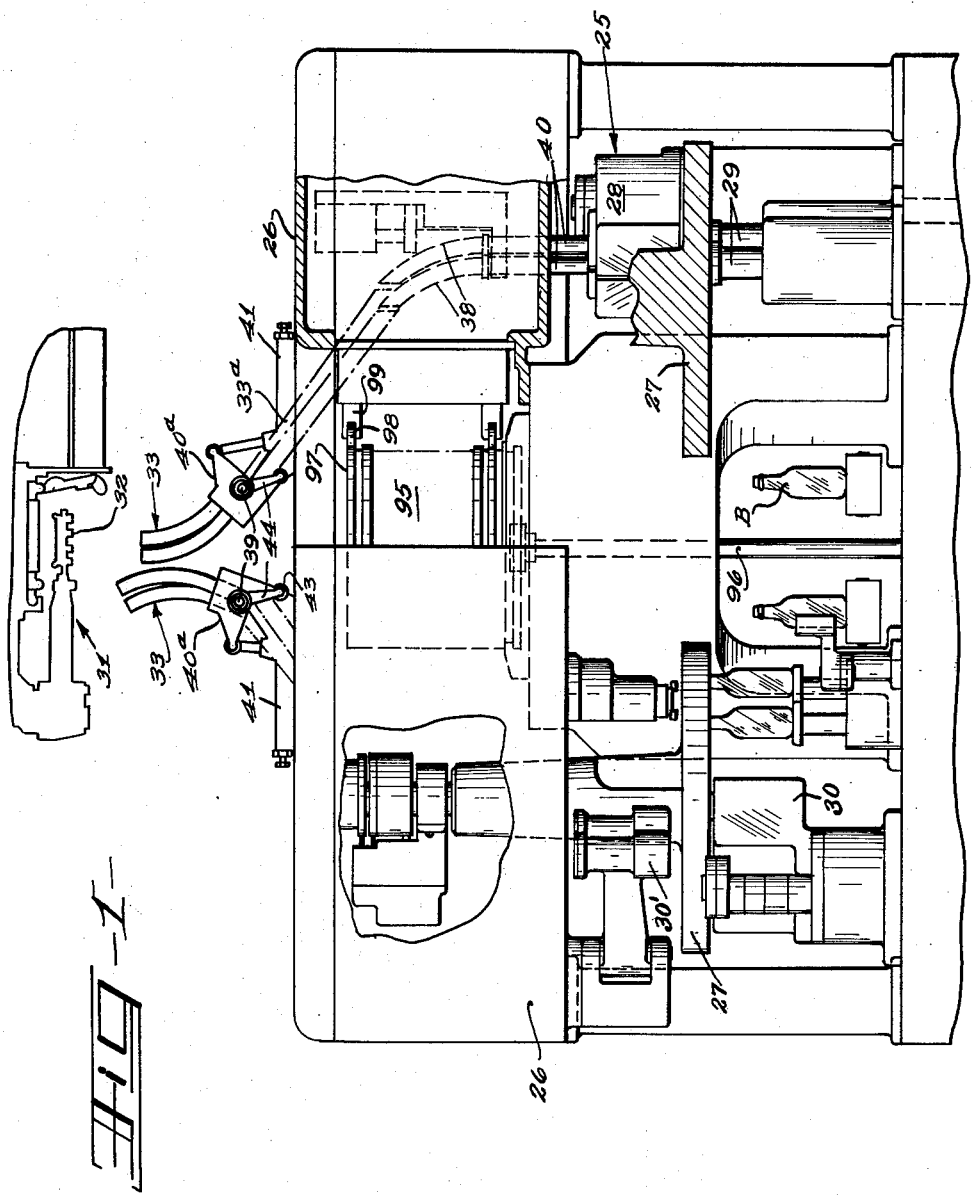

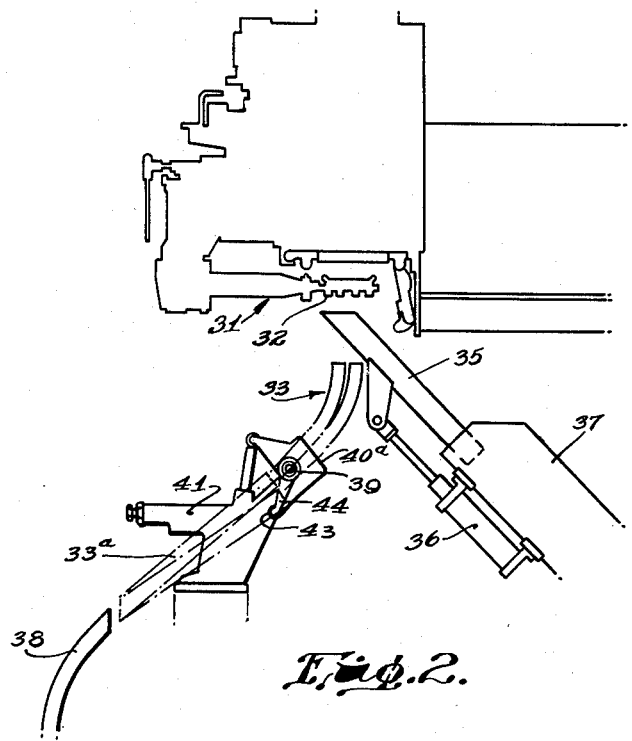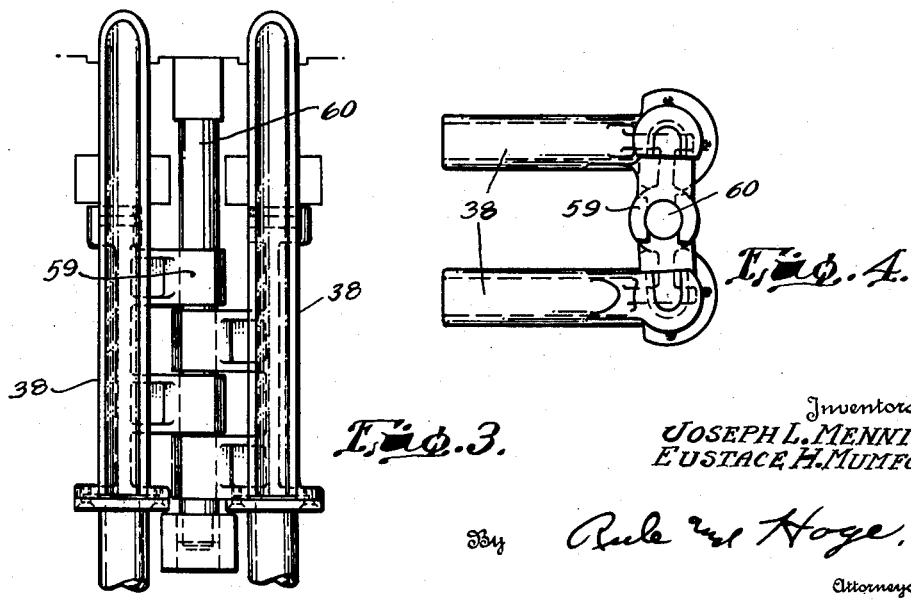

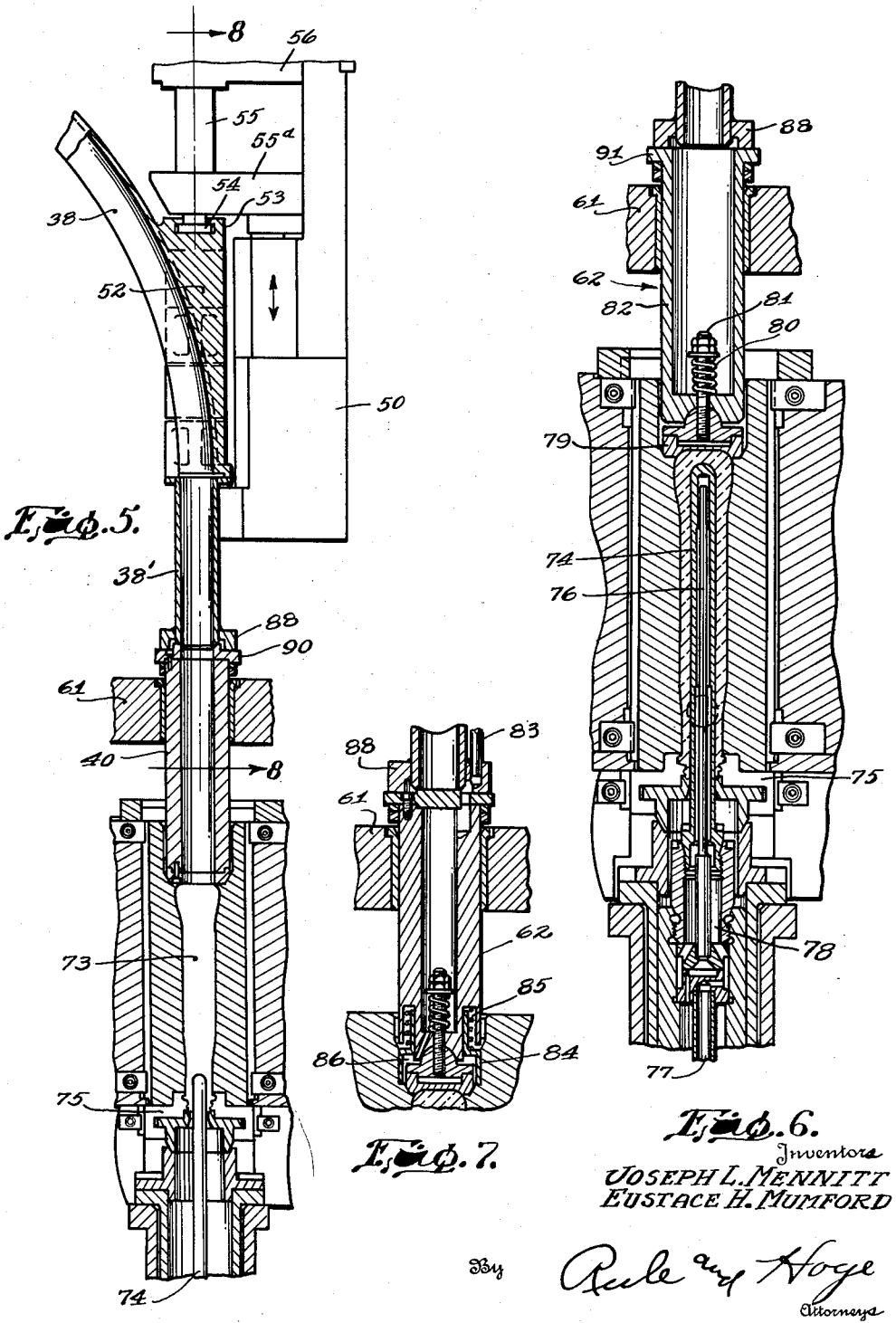

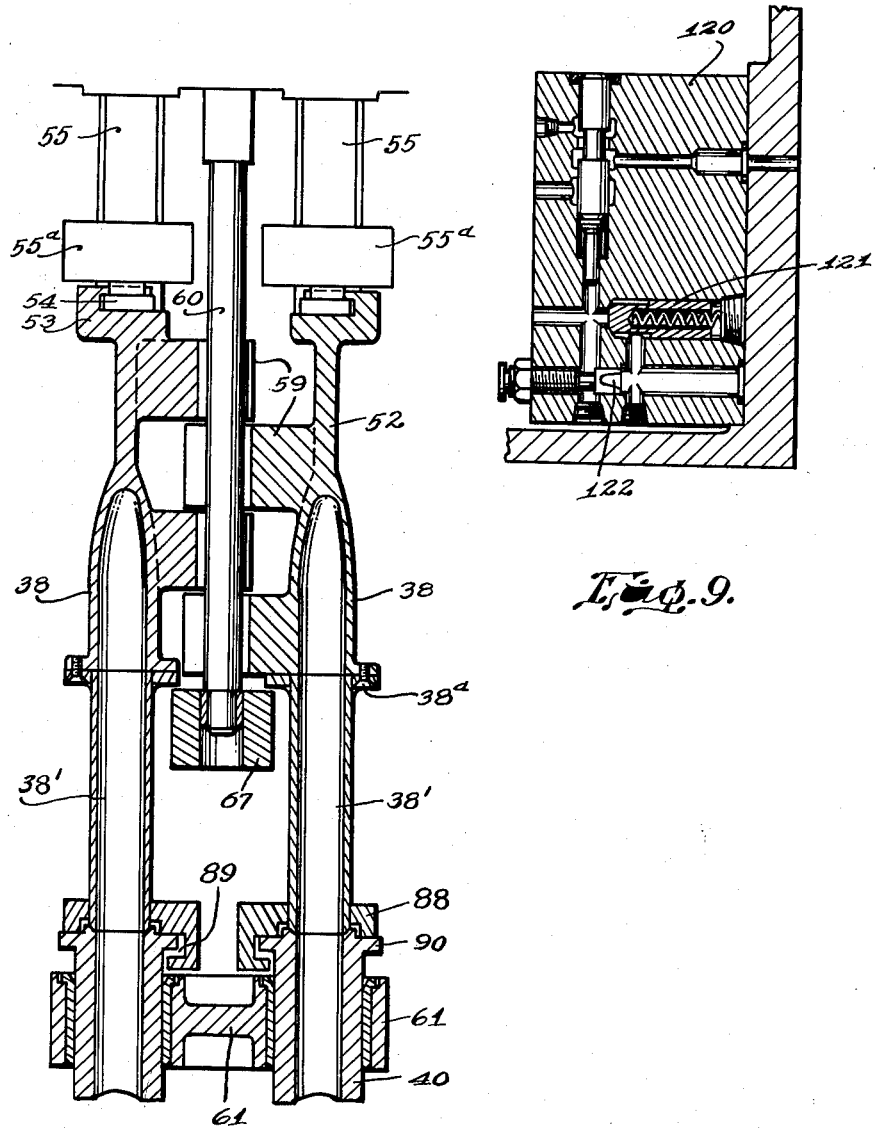

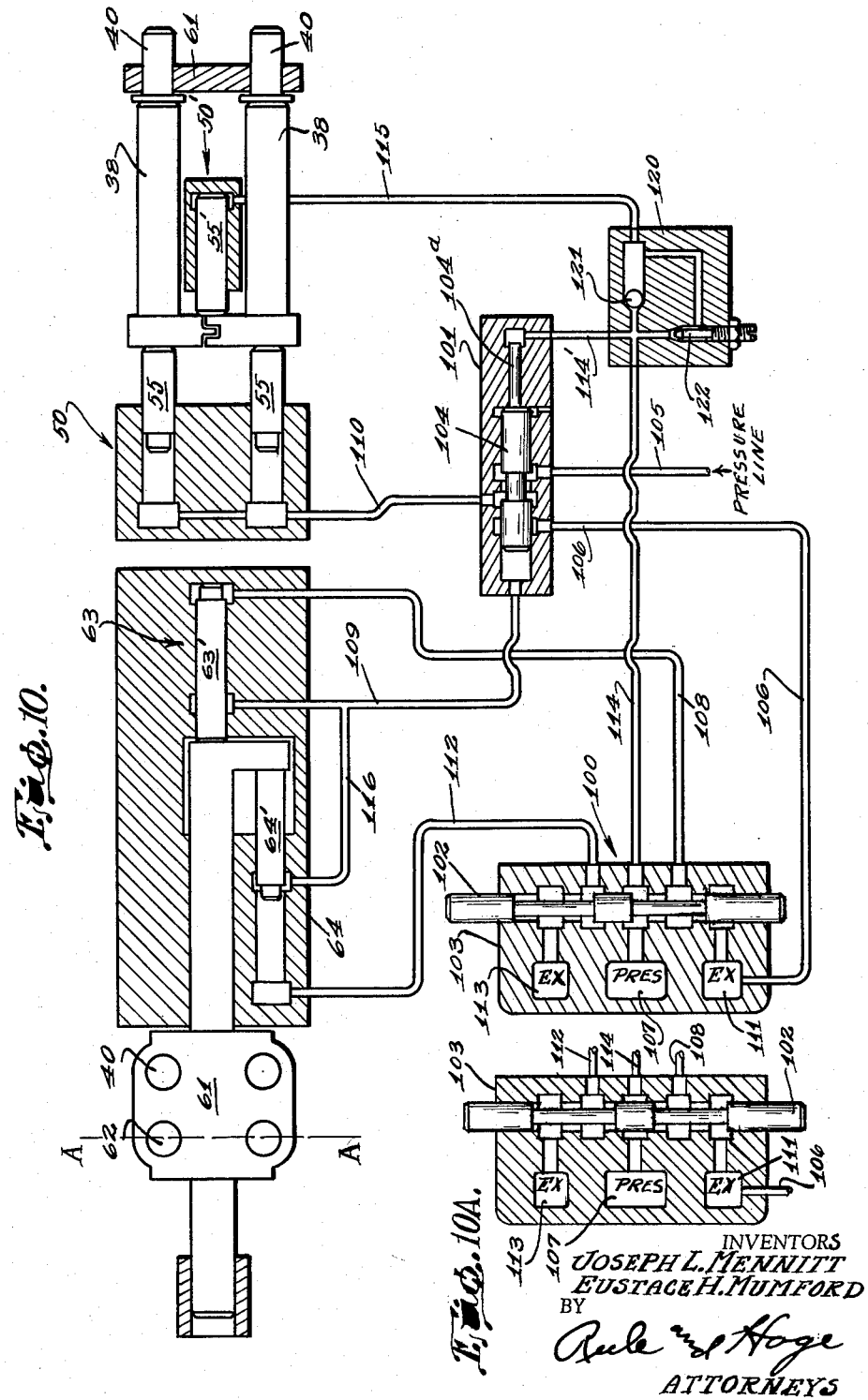

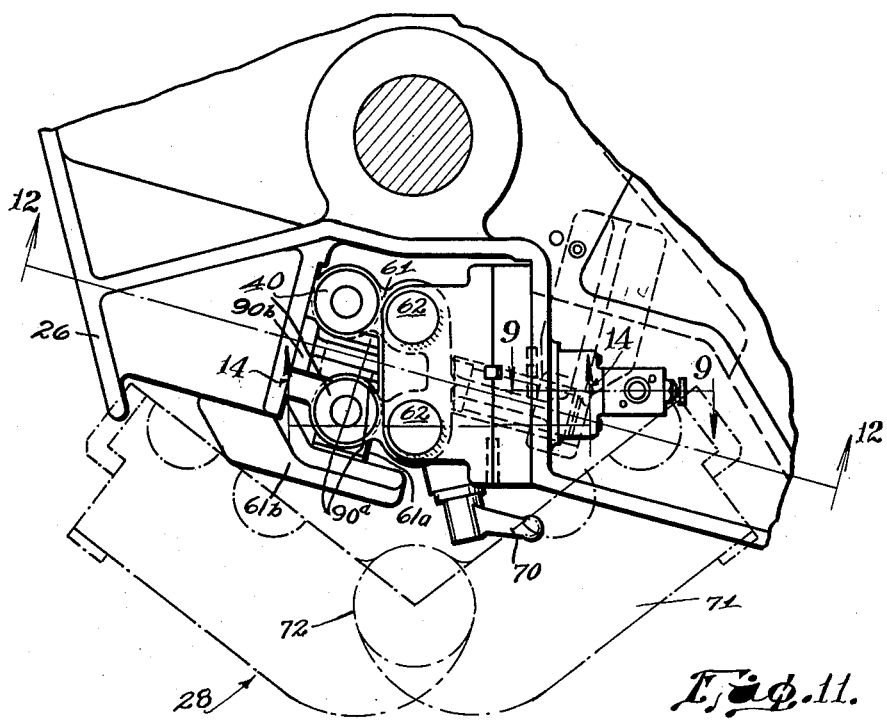

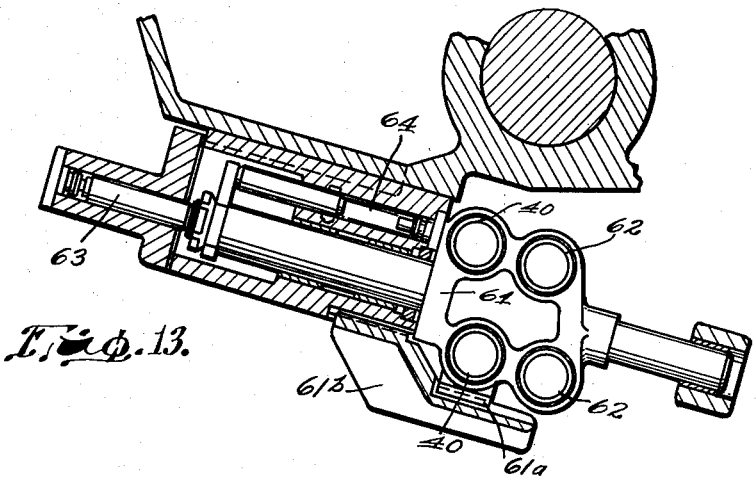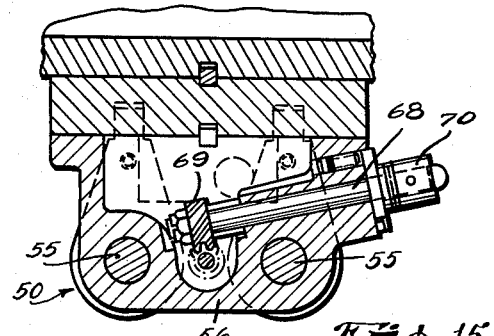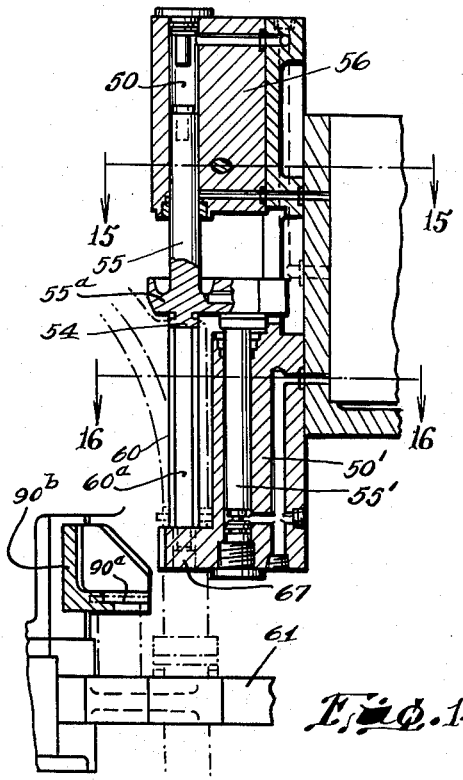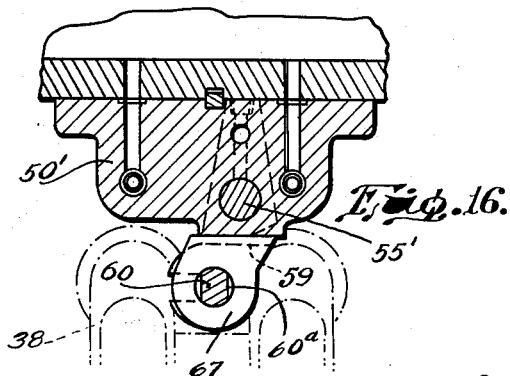
INVENTORS
JOSEPH L. MENNITT
EUSTACE H. MUMFORD
BY Rule and Hoge,
ATTORNEYS

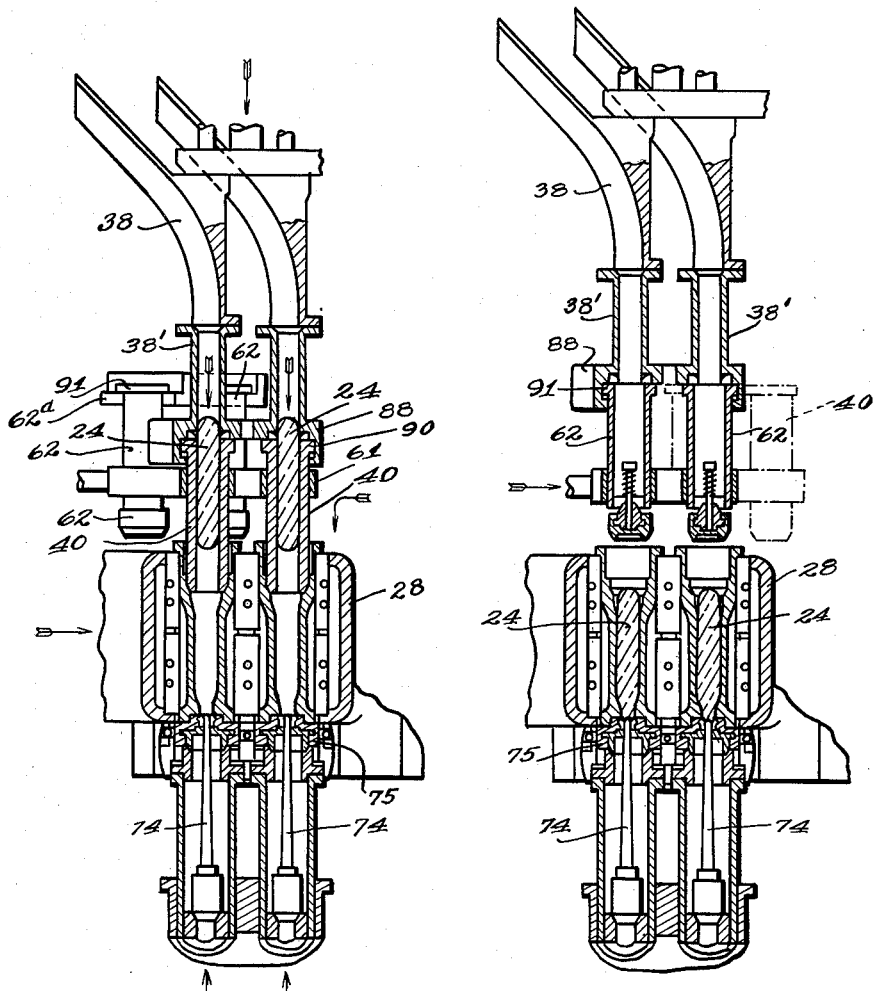

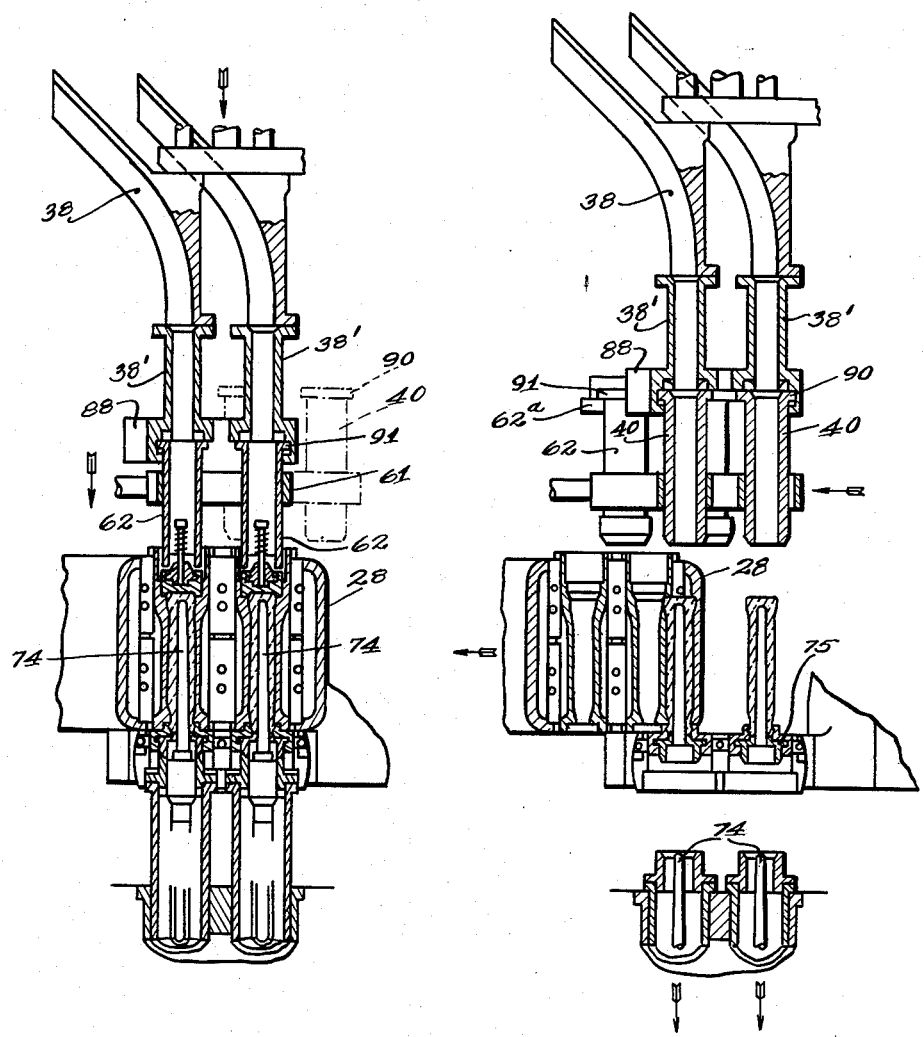

2,984,047
APPARATUS FOR TRANSFERRING AND MOLDING CHARGES OF MOLTEN GLASS

Joseph L. Mennitt, Toledo, Ohio, and Eustace H. Mumford, Ottawa Lake, Mich., assignors to Owens-Illinois Glass Company, a corporation of Ohio Filed May 8, 1957, Ser. No. 657,820

9 Claims. (Cl. 49—5)

Our invention relates to the manufacture of molded articles made of glass or other thermoplastic materials. The invention is particularly adapted for use in the manufacture of molded glass articles by methods in which mold charges or gobs of molten glass are dropped by a gob feeder and directed into the open ends of parison molds. Baffles are then brought into position to close the upper ends of the mold cavities. The parisons are then formed by pressing or blowing operations.

The invention in the form herein shown is designed for use with so-called narrow neck machines, having split blank molds, for making bottles or other narrow neck ware. The mold halves are brought together and a gob of molten glass delivered by gravity and directed into the mold cavity by means of a gob chute and funnel system. A baffle is then lowered on to the blank within the mold, closing the mold cavity. The blank is formed into a hollow parison by pressing or blowing and thereafter blown to final form in a finishing mold.

In the form of the invention herein illustrated plural cavity blank molds are provided for simultaneously molding a plurality of blanks. The mold charges or gobs are formed, severed from the supply body, dropped into gob chutes, carried by gravity through the chutes and guides individual to the gobs and are thereby directed to deflectors which deflect them from an inclined to a vertical path and direct them into vertical tubes or funnel guides through which the gobs drop into the blank molds therebeneath. The funnel guides and baffles are moved laterally as a unit by a head or carrier for positioning them alternatively over and in register with the mold cavities. The movements of these parts include a horizontal movement of the carrier by which the funnels are positioned over and in register with the blank mold cavities, downward movement of the funnels by which their lower ends are moved into the mold cavities for guiding the falling gobs into the molds, upward movement of the funnels and lateral movement of the carrier for withdrawing the funnels and positioning the baffles directly over the mold cavities, and a downward movement of the baffles to seat in the molds. Plungers are then projected upwardly through the lower ends of the molds and the parisons formed by pressing or blowing within the parison mold cavities. Thereafter the parison are transferred to finishing molds in which they are blown to final form.

The movements of the various parts are preferably performed by hydraulically operated piston motors or cylinders, oil being used as the hydraulic fluid.

Referring to the accompanying drawings which illustrate a preferred form of apparatus:

Fig. 1 is an elevational view, partly diagrammatic, with parts broken away and parts shown in section, showing two molding machine units of the narrow neck type for molding bottles, and the apparatus for delivering plural mold charges in alternation to the two machines;

Fig. 2 is a diagrammatic elevational view showing a gob feeder, gob chutes, deflectors and a cullet chute;

Fig. 3 is an elevational view showing the concave sides of the downwardly and outwardly inclined deflectors;

Fig. 4 is a top plan view of the same;

Fig. 5 is a fragmentary vertical section showing a deflector and attached funnel, a parison mold, and means for lifting and lowering the deflectors, funnels and baffles;

Fig. 6 is a sectional elevation on a larger scale showing a baffle in position in the parison mold;

Fig. 7 is a fragmentary detailed sectional view showing a modified form of baffle;

Fig. 8 is a sectional elevation of the deflectors and funnels at the sectional line 8—8 on Fig. 5;

Fig. 9 is a section at the line 9—9 on Fig. 11, showing a portion of the hydraulic control system;

Fig. 10 is sectional diagrammatic view of the hydraulic system for shifting the deflectors, funnels and baffles;

Fig. 10A is a view of the main valve with its piston shifted from the Fig. 10 position to a central position;

Fig. 11 is a plan view, partly diagrammatic, showing funnel and baffle mechanism and its relation to the blank mold carrying arms, the latter shown in broken lines;

Fig. 12 is a section at the line 12—12 on Fig. 11, showing a piston motor for shifting the deflectors and baffles horizontally;

Fig. 13 is a section at the line 13—13 on Fig. 12;

Fig. 14 is a section at the line 14—14 on Fig. 11, showing the piston motors for lowering and lifting the funnels and baffles;

Fig. 15 is a section at the line 15—15 on Fig. 14;

Fig. 16 is a section at the line 16—16 on Fig. 14; and

Figs. 17 to 20 are sectional elevations, partly diagrammatic, showing the means for guiding the gobs into the blank molds and forming the parisons, said views showing the relation of parts at successive steps in the operation.

Referring particularly to Fig. 1, the invention is shown as used with a plurality of press molding machine units 25 mounted on a frame 26. Each molding unit comprises a turret 27 rotatable about a vertical axis and is provided with a plurality of neck molds 75. The machine units are of the narrow neck type for molding bottles B. Each machine unit includes in addition to the turret, a plural cavity blank mold 28 mounted on frame 26 to cooperate with the turret 27, a press plunger 29 having a stationary mounting on the frame 26, a finishing mold 30 in which the parisons are blown to finished form by air supplied through blow heads 30' and a takeout station where the finished ware is removed from the neck molds 75.

Mold charges or gobs 24 (Figs. 17, 18) of molten glass are supplied in pairs to the parison molds. A conventional gob feeder 31 (Figs. 1 and 2) includes shears 32 by which the pair of gobs are severed from the supply body and dropped into gob chutes 33. The pairs of gob chutes 33 are individual to the molding machine units and are moved in succession into register with the gob feeder as presently described. As shown in Fig. 2 a cullet trough 35, operated by a piston motor 36, may be projected into position to deflect the gobs into a cullet chute 37.

Each pair of gob chutes 33 when in register with the gob feeder directs the gobs into a pair of stationary, trough shaped guides 33ª. The gobs pass from the guides 33ª to deflectors 38 by which they are deflected from an inclined to a vertical path and are carried vertically downward through tubes 40, herein referred to as funnels, into the blank mold cavities below and in register therewith.

Each pair of gob chutes 33 is mounted to swing about the axis of a horizontal pivot pin 39 to which is secured a head or rocker 40ª (Figs. 1 and 2). The means for swinging the chutes 33 out of register with the gob feeder includes a horizontal piston motor 41. The motor 41 comprises a piston which engages a roll 43 on a rock arm 44 on the head 40ª.

The funnels 40 and the baffles 62 are all movable horizontally as a unit into and out of positions for bringing the baffles and funnels alternately into vertical register with the blank mold cavities. The pair of funnels and the pair of baffles are separately movable up and down, each while in register with the mold cavities. The horizontal movements of the funnels and baffles are effected by horizontal piston motors 63 and 64 (Figs. 12 and 13), as presently described. The up-and-down movements are effected by vertical piston motors 50 and 50' (Figs. 5 and 14).

Means providing operating connections between the deflectors 38 and the vertical piston motors 50, 50', include webs 52 formed on the deflectors as shown in Figs. 5 and 8. The webs are formed at their upper ends with connecting heads 53 which are recessed or slotted for slidable interlocking connection with flanged pieces 54 (Figs. 5, 8 and 14). The parts 54 are formed on a block 55ª integral with the pistons 55 of the motor 50. These pistons move up and down in a block or casting 56. The motors 50 and 50' operate through these connections to lower and lift the deflectors and thereby move the funnels into and out of the parison mold cavities.

The deflectors 38 are formed with bifurcated lugs 59 which straddle a vertical shaft 60 and by which the deflectors are removably attached to the shaft and held in assembled relation. The lower end of the shaft is journalled in a lug 67 (Figs. 8 and 14) at the lower end of the casting 56. The shaft 60 is formed with flattened sides 60ª, Fig. 16, and is rotatable about its axis to permit the deflectors to be withdrawn laterally away from the shaft 60. Means for rotating the shaft 60 includes a transverse shaft 68 (Fig. 15) carrying a worm gear 69 meshing with a gear on the shaft 60. The shaft 68 carries at its outer end a crank 70 (Figs. 11 and 15) by which the shaft 68 may be rotated, thereby rotating the connecting shaft 66 through an angle of 90° permitting withdrawal of the deflectors 38.

The motors 63 and 64 for moving the funnels and baffles horizontally, operate through a connecting device or head 61 which is in the form of a plate with openings through which the funnels and baffles extend and are slidable vertically during the lifting and lowering of the funnels and baffles as hereinafter described. The head or slide 61 is guided in its sliding movement by means of an integrally formed slotted portion 61ª (Fig. 11) adapted to embrace and slide on a horizontal slideway 61ᵇ. The horizontal slideway 61ᵇ along with the motors 63 and 64 are fixed to a part of the frame 26. In this manner the funnels and baffles are connected for horizontal movement as a unit, permitting the pair of funnels and the pair of baffles to be brought alternately into register with the blank mold cavities therebeneath.

Referring to Fig. 11, the blank mold sections are mounted in a pair of arms 71 which swing about the axis of a pivot 72, to and from closed position. The mold sections when brought together provide parison mold cavities 73 (Fig. 5) to receive the gobs. A plunger 74 projects upwardly through the neck ring 75. After the gobs are dropped into the mold cavities 73 the funnels 40 are withdrawn and the baffles 62 are moved downward into the mold cavities as shown in Fig. 6. The press plunger 74 is then moved upwardly for forming the parisons. Means for circulating a cooling fluid through the plunger includes a tube 76 extending upward in the plunger. Each baffle includes a head 79. A coil compression spring 80, mounted on a stem 81 holds the head 79 in contact with the tubular body 82.

Fig. 7 illustrates a modification. Air under pressure for the usual settle blow is supplied through pipe 83. A sleeve 84 surrounding the baffle head is projected downwardly by a coil compression spring 85. While the baffle is moving downward to seat within the mold cavity the sleeve 84 is arrested and thereby retracted upwardly relative to the baffle. This provides an annular space 86 in connection with the pressure pipe 83 through which the air pressure is supplied for the settle blow.

Attached to each curved deflector 38 at its lower end is a vertical tube 38'. As shown in Fig. 8 the parts 38, 38' are connected by screws 38ª. These tubes 38' form parts or extensions of the deflector. Attached to the lower ends of the sections 38' are connecting devices or heads 88 formed with grooves 89 adapted to slidably receive flanges 90 formed on the upper ends of the funnels 40. The lowering and lifting of the baffles 62 and funnels 40 is accomplished as follows. When the deflector 38 is raised on the funnel lifting stroke, moving the funnels 40 upwardly through the openings in the head 61, it brings the head 88 and flange 90 of a funnel 40 into horizontal alignment with a groove 90ª in a support member 90ᵇ. Thus, when head 61 shifts to the left (as in Fig. 13) the funnels 40 slidably move out of the head 88 and into contact with groove 90ª of a support 90ᵇ (see Figs. 11, 12 and 14). Simultaneously the baffles 62 have also slidably moved left from their position on support 62ª and the flanges 91 thereof are brought into contact with the heads 88 and into alignment with the mold cavities 73, as shown in Figs. 6 and 11–13. Both supports 90ᵇ and 62ª are fixedly mounted on portions of the frame 26. The piston motor 50 is actuated to lower the baffles 62 into mold contact and the parison is pressed in the mold. Piston motor 50' is then actuated to lift the baffles 62 and clear the blank mold 28 so that it may be opened and the parison transferred to the blowing station. With the initiation of the next parison forming cycle the head 61 will shift to the right (see Figs. 11 and 13) to slide the baffles 62 out of head 88 and position them upon support 62ª. Simultaneously the funnels 40 will be moved by head 61 from their position upon support 90ᵇ into engagement with the head 88 and then lowered into the cavities 73 in the mold 28. With this above described construction the funnels, as they are moved horizontally, are brought into engagement with the deflectors and into register with the mold cavities by the horizontal movement of the head 61. Likewise the baffles 62 with their flanges 91 (Figs. 17, 18) engage with the connecting heads 88 when the baffles are moved horizontally into register with the mold cavities, thus operatively connecting the baffles with the vertical motors for up-and-down movements. It will be seen that with the construction just described, the horizontal movement of the funnels and baffles, by which the funnels are brought into register with the mold cavities, automatically connects the funnels for up-and-down movement with the deflectors 38 and heads 88 and the same horizontal movement disconnects the baffles from the deflectors so that the baffles remain at rest in their upper position at one side of the mold while the funnels are lowered and lifted. Upon the reverse horizontal movement of the funnels and baffles the latter are brought into register with the mold cavities and connected for their vertical movements while the funnels are disconnected from the deflectors and held in their lifted position at one side of the mold cavities.

Figs. 17 to 20 illustrate successive steps in the operation of delivering mold charges to the blank molds and forming the parisons. Fig. 17 shows the funnels 40 lowered into the mold cavities and the gobs of molten glass 24 dropping through the funnels. The tips of the plungers 74 are projected into the neck rings 75. When the gobs 24 have entered the mold cavities the funnels are lifted and the head 91 is then shifted horizontally to carry the funnels out of register with the mold cavities, thus disconnect them from the deflectors 38, and by the same movement bringing the baffles 62 over and in register with the mold cavities and connecting them for vertical movement with the deflectors. The parts are now in the relative positions shown in Fig. 18. The next step, as shown in Fig. 19, consists in moving the deflectors with the attached baffles downward for seating the baffles within the mold cavities. The plungers 74 are also moved upward into the molten gobs and the latter molded by pressing or blowing to form the parisons. The baffles are then withdrawn upwardly as shown in Fig. 20 and the mold 28 opened. The plungers 74 are also withdrawn downwardly. This leaves the bare parisons supported in the neck rings 75, permitting them to be transferred to the finishing molds. The blank mold is then closed, the funnels and baffles moved horizontally, and the funnels again moved downwardly, completing the cycle, with the parts in the Figs. 17 position.

The valves which control the operation of the various hydraulic motors are under the control of timer mechanism including a cam drum 95 (Fig. 1). The drum is mounted on frame 26 and driven by a vertical shaft 96 which is rotated in synchronism with the feeder shears 32 and controls the actuation of the operative machine elements. The cam drum is common to all of the molding machine units. Cams 97 on the drum operate cam follower rolls 98 on the valve operating arms 99.

Referring to the hydraulic diagram (Fig. 10) the control mechanism includes a main valve 100 and a valve 101. The main valve 100 includes a piston 102 mounted in a valve block 103 and actuated by cams 97 (Fig. 1). A pressure chamber 107 in the block 103 is connected to a source of continuous hydraulic pressure. Exhaust chambers 111 and 113 are open to exhaust. The valve 101 includes a piston 104 with an extension 104ᵃ of reduced diameter. The right-hand end of the piston is under continuous hydraulic pressure supplied from the pressure chamber 107 through a line 114 and branch line 114'. The piston 104 is periodically shifted to the right by hydraulic pressure applied to the left-hand end of the piston which presents a comparatively large area to said pressure.

The valve block 120 has mounted therein a check valve 121 and a throttle valve 122. The valve block 120 is in a pressure line extending from the pressure chamber 107 through line 114, throttle valve and a line 115 to the right-hand (lower) end of the piston motor 50'. The throttle 122 serves to control the speed at which the baffles and the funnels are lowered, by throttling the exhaust fluid expelled by the motor piston 55' during the lowering of the funnels or baffles.

As shown in the diagram (Fig. 10) the head 61 has been moved to the right so that the baffles 62 are over the mold cavities, the vertical plane of the mold cavities being indicated by the line A—A.

The operation of the hydraulic system is as follows: While the valve piston 102 is in its upper position (Fig. 10) pressure is transmitted from pressure chamber 107 through line 108 and applied behind the piston 63' of the motor 63 and thereby shifts the head 61 to the left, thus bringing the funnels 40 over the mold cavities at the line A—A. As the piston 63' completes its forward movement it opens a line 109 extending to the valve 101 and applies pressure which shifts the valve piston 104 to the right, namely, the position shown. This opens a pressure line 105 through the valve 101 and a line 110 to the motor 50, thereby supplying pressure to the pistons 55 and lowering the funnels 40. During this lowering movement the motor piston 55' forces the exhausting fluid through the line 115, throttle valve 122 and line 114, thereby retarding and controlling the rate at which the funnels are moved downward.

The main valve piston 102 is then moved to its center position (Fig. 10A) by its operating cam 97 (Fig. 1). This connects the line 108 to the exhaust chamber 111 and connects the line 112 to exhaust chamber 113. At the same time pressure is applied from the chamber 107 through lines 114 and 114'. This shifts the piston 104 to the left, thereby connecting line 110 to exhaust through line 106 and port 111. Pressure is also supplied at the same time (through lines 114, 115) to the motor 50' which is thereby operated to lift the funnels 40 out of the molds. The main valve piston 102 is then shifted to a lowered position (not shown) so that pressure is supplied from 107 through line 112 and operates the motor 64, thereby shifting the head 61 to the right and bringing the baffles 62 over the molds. The motor 63 at this time is connected to exhaust through the line 108. As the motor piston 64' completes this movement it opens the line 116 to the pressure within the motor cylinder. This pressure transmitted through lines 116 and 109 is applied to the valve piston 104, shifting it to the right. This opens the pressure line 105 through line 110 to the motor 50 which accordingly operates to lower the baffles. After the baffles are lowered the main valve 102 is again shifted to its central position, thereby supplying pressure from the chamber 107 through lines 114 and 115 to the motor 50' which operates to lift the baffles. This completes the cycle.

Modifications may be resorted to within the spirit and scope of our invention.

We claim:

1. The combination of a mold having an upwardly opening mold cavity, said mold positioned at a charge receiving station, a deflector positioned above the mold at said station, said deflector having a curved guiding surface by which charges of molten glass falling in an inclined path are guided from an inclined to a vertical direction, a deflector support arranged for vertical reciprocation, a piston motor comprising a vertical piston operatively connected to the deflector support for moving it up and down, a funnel mounted on a horizontally reciprocable slide, said funnel arranged to be releasably connected to the deflector support for up-and-down movement therewith and for projecting the funnel into and withdrawing it out the mold cavity, a second motor, means connecting said second motor to said slide for moving it laterally to bring said funnel into and out of register with the deflector, said lateral movement alternately connecting and disconnecting said funnel from said deflector support and means for alternately supporting said funnel when disconnected from said deflector support.

2. The combination set forth in claim 1, including a baffle positioned at one side of the said funnel and mounted on said slide, said baffle moving as a unit with the funnel when the later is shifted by said second motor, said baffle being brought into register with the mold cavity by said second motor when the funnel is moved laterally out of register with the mold cavity, and means connecting the baffle to said deflector support for up-and-down movement by the first mentioned motor while the baffle is in register with mold cavity and for seating the baffle within the mold.

3. The combination set forth in claim 2, including a press plunger mounted for movement into the mold cavity for molding a charge of glass while the baffle is seated within the mold.

4. Apparatus for transferring and molding charges of plastic material, comprising a parison mold with an open-ended mold cavity positioned at a charge receiving station, a curved deflector mounted on a movable support disposed above the top of said mold, said deflector positioned to guide a mold charge into vertical alignment with said mold cavity, a slide mounted in a slideway disposed in a horizontal plane between the bottom of said deflector and said mold top, said slide having a vertical guide member and a mold baffle member mounted thereon and movable vertically therein, a motor adapted for shifting said slide laterally in said horizontal plane to bring the said members alternately into and out of a position of register with said mold cavity and deflector, a member lifting mechanism formed on the lower end of said deflector and adapted to be alternately connected and disconnected with each said member through the horizontal movement of said slide, means to support each said alternately disconnected member in an inoperative position and out of alignment with said cavity, a motor for actuating said deflector and its support and adapted for vertically moving said deflector and an alternately connected guide or baffle member to thereby alternately project said connected member into and out of aligned contact with the mold cavity, and a timing means adapted to actuate both said motors in predetermined sequence.

5. Apparatus for molding charges of plastic material, comprising a vertically disposed mold with an open-ended mold cavity positioned at a charge receiving station, a vertically disposed funnel above the mold and normally positioned to guide a mold charge into said mold cavity, a motor for shifting the funnel laterally into and out of a position in vertical register with the mold cavity, a baffle, a horizontally disposed slide connecting said funnel and baffle for movement laterally as a unit for moving the said funnel and baffle alternatively into vertical register with and over the mold cavity, said slide mounted in a horizontal slideway formed as a part of a stationary support, a vertically movable support, a second motor attached to said stationary support and arranged to reciprocate said vertically movable support, means connected to the bottom of said vertically movable support for releasably engaging said baffle and funnel, the lateral movement of the funnel and baffle operating alternately to connect the funnel and baffle with said vertically movable support, the said second motor being arranged to lower and lift the said funnel and baffle into and out of the mold cavity, means for supporting the baffle when the funnel is is in engagement with the movable support, and means for supporting the funnel when the baffle is in engagement with the movable support.

6. An apparatus for molding charges of molten glass comprising a plural cavity mold with upwardly opening mold cavities, said mold positioned at a charge receiving station, means for guiding gobs of molten glass into the mold cavities, said guiding means including a support for a pair of gob chutes by which the gobs are guided in a downwardly inclined path, deflectors positioned at the lower ends of the said gob chutes to guide the gobs from an inclined to a vertical direction of movement, funnels positioned beneath the deflectors and normally in register with the deflectors and mold cavities, baffles individual to the mold cavities and movable into and out of register therewith, a vertically movable deflector support, a horizontally disposed slide member, said slide member mounting said funnels and baffles for lateral movement as a unit, means for releasably connecting the funnels and baffles to said deflectors for up-and-down movement therewith when the funnels and baffles are moved into register with the mold cavities, means for supporting the funnels and baffles when out of registry with the mold cavities, a motor having an operating connection with the said deflector support for lowering and lifting the funnels, baffles and deflectors to thereby alternately project the funnels and baffles into the mold cavities and thereafter withdrawing the funnels and baffles from the mold cavities, a second motor connected to said slide member for shifting it laterally and thereby moving the funnels and baffles alternatively into register with the mold cavities, means cooperating with the baffles for molding the charge of glass and thereby forming molded parisons, said motor being hydraulically operated, valves controlling the operation of said motors, a timer, and cam means operable by the timer for operating said valves and effecting the operation of said motors.

7. Apparatus for molding charges of plastic material, comprising a vertically disposed mold with an open-ended mold cavity positioned at a charge receiving station, a vertically disposed funnel above the mold and normally positioned to guide a mold charge into said mold cavity, the funnel being mounted for lateral movement into and out of a position in vertical register with the mold cavity, a baffle, a slide for carrying said funnel and baffle and arranged for moving the baffle into registry with the mold cavity when the funnel is moved out of registry, a motor for moving said slide whereby said funnel and baffle are moved into and out of register with said cavity, said slide mounted in a horizontal slideway formed as a part of a fixed support, a vertically movable support, a second motor attached to said vertically movable support and arranged to reciprocate same, said movable support having funnel and baffle connecting means thereon, the lateral movement of the funnel and baffle operating alternately to connect the funnel and baffle with said vertically movable support, the said second motor being operative to lower and lift said movable support to thereby move the said funnel and baffle into and out of the mold cavity, means carried by said fixed support made operative by the lateral movement of the baffle into register with the mold cavity to support the funnel out of alignment with said mold cavity, means carried by said fixed support operable by a reverse movement of the funnel and baffle to support the baffle out of alignment with said mold cavity, said motors being hydraulically operated, hydraulic valves for the control of said motors and a timing cam drum for effecting the timed operation of said valves.

8. An appartus for molding charges of molten glass comprising a plural cavity mold with upwardly opening mold cavities, said mold positioned at a charge receiving station, means for guiding charges of molten glass into the mold cavities, said guiding means including a support for a pair of gob chutes by which the charges are guided in a downwardly inclined path, deflectors positioned at the lower ends of each of said gob chutes to guide the charges from an inclined to a vertical direction of movement, funnels positioned beneath and normally in vertical alignment with the deflectors and the mold cavities, baffles individual to the plural mold cavities and movable into and out of register therewith, a vertically movable deflector support, a horizontally disposed slide member, said slide member mounting said funnels and baffles for lateral movement as a unit, a motor connected to said slide member for shifting it laterally and thereby moving the funnels and baffles alternatively into register with the mold cavities, means for releasably connecting the baffles and funnels to said deflectors for up-and-down movement therewith when the baffles and funnels are moved into register with the mold cavities, said baffles and funnels being mounted in said slide member for vertical movement relative to said slide member and arranged for individual registration with each said cavity, a second motor having an operating connection with the said deflector support for vertically reciprocating the funnels, baffles and deflectors to thereby alternately project the funnels and baffles into the mold cavities and thereafter withdrawing the funnels and baffles from the mold cavities, means cooperating with the baffles for molding the charges of glass and thereby forming molded parisons, said motors being hydraulically operated, valves controlling the operation of said motors, a timer, and cam means operable by the timer for operating said valves and effecting the operation of said motors.

9. Apparatus for molding charges of plastic material, comprising a vertically disposed pressing mold with an open-ended mold cavity positioned at a charge receiving station, a vertically disposed funnel above the mold and positioned to guide a mold charge into said mold cavity, the funnel mounted for movement laterally into and out of a position in vertical register with the mold cavity, a baffle, a slide mounting said funnel and baffle and arranged for moving the baffle into register with the mold cavity when the funnel is moved out of register, a motor for moving said funnel and baffle into and out of register with said cavity, a vertically movable support mounted for movement adjacent said funnel and baffle, a second motor for reciprocating said movable support, said second motor being operative to lower and lift the baffle into and out of the mold cavity, means operative by the lateral movement of the baffle into register with the mold cavity, to connect the baffle with said vertically movable support and concurrently disconnect the funnel therefrom, means operable by a reverse movement of the funnel and baffle to connect the funnel to said movable support and disconnect the baffle therefrom, means for supporting the funnel and baffle when moved out of registry with said mold cavity, a glass pressing plunger at said charging station and arranged to cooperate with said pressing mold, and timing means arranged to actuate said motors to move said baffle and actuate said pressing plunger when in glass pressing relationship with respect to the mold in a preselected sequence.

References Cited in the file of this patent

UNITED STATES PATENTS

| | | |
|---|---|---|
| 1,662,848 | Cramer | Mar. 20, 1928 |
| 1,678,233 | Soubier | July 24, 1928 |
| 1,693,069 | Cramer | Nov. 27, 1928 |
| 1,852,171 | Lobb | Apr. 5, 1932 |
| 1,866,506 | Miller | July 5, 1932 |
| 1,878,863 | La France | Sept. 20, 1932 |
| 2,116,284 | Ross | May 3, 1938 |
| 2,148,220 | Ross | Feb. 21, 1939 |
| 2,388,876 | Smith | Nov. 13, 1945 |